(12) United States Patent
Crowley et al.

(10) Patent No.: US 10,494,007 B2
(45) Date of Patent: Dec. 3, 2019

(54) EXTENDABLE STRUT

(71) Applicants: Aaron Crowley, Canby, OR (US);
Roger Crowley, Tualatin, OR (US)

(72) Inventors: Aaron Crowley, Canby, OR (US);
Roger Crowley, Tualatin, OR (US)

( * ) Notice: Subject to any disclaimer, the term of this patent is extended or adjusted under 35 U.S.C. 154(b) by 182 days.

(21) Appl. No.: 15/675,362

(22) Filed: Aug. 11, 2017

(65) Prior Publication Data
US 2017/0341669 A1    Nov. 30, 2017

Related U.S. Application Data

(63) Continuation of application No. 15/212,223, filed on Jul. 16, 2016, now Pat. No. 9,751,550.

(60) Provisional application No. 62/198,121, filed on Jul. 28, 2015.

(51) Int. Cl.
| | | |
|---|---|---|
| B62B 3/02 | (2006.01) |
| B62B 3/08 | (2006.01) |
| B62B 3/10 | (2006.01) |
| B62B 3/04 | (2006.01) |
| B62B 7/08 | (2006.01) |
| B62B 3/06 | (2006.01) |
| B65G 7/08 | (2006.01) |
| F16B 7/10 | (2006.01) |

(52) U.S. Cl.
CPC .............. *B62B 3/0612* (2013.01); *B62B 3/02* (2013.01); *B62B 3/04* (2013.01); *B62B 3/08* (2013.01); *B62B 3/10* (2013.01); *B62B 3/108* (2013.01); *B65G 7/08* (2013.01); *F16B 7/10* (2013.01); *B62B 2202/62* (2013.01); *B62B 2203/10* (2013.01); *B62B 2206/00* (2013.01); *B62B 2206/003* (2013.01); *B62B 2206/06* (2013.01)

(58) Field of Classification Search
CPC ....... F16B 7/10; B66C 23/701; B66C 23/707; B62B 3/108
See application file for complete search history.

(56) References Cited

U.S. PATENT DOCUMENTS

| | | | | |
|---|---|---|---|---|
| 3,796,016 A | * | 3/1974 | Wu ........................ | B66C 23/705 212/350 |
| 4,004,695 A | * | 1/1977 | Hockensmith ........ | B66C 23/701 212/350 |
| 4,339,219 A | * | 7/1982 | Lay ...................... | E04F 21/1822 254/4 C |
| 4,759,452 A | * | 7/1988 | Faint ..................... | B66C 23/707 212/350 |
| 6,499,612 B1 | * | 12/2002 | Harrgington .......... | B66C 23/701 212/270 |
| 2003/0205547 A1 | * | 11/2003 | Dupre .................... | B66C 13/12 212/349 |
| 2006/0219650 A1 | * | 10/2006 | Gokita .................. | B66C 23/707 212/350 |

(Continued)

FOREIGN PATENT DOCUMENTS

DE         10020866 A1  * 10/2001  ............. F16M 11/28

*Primary Examiner* — Daniel J Colilla

(57) ABSTRACT

An extendable strut assembly comprises a nested series of square or rectangular beams, the centermost of which may be a solid bar and all others are hollow sections. Glide strips of predetermined thicknesses take up the clearances between the beams and can be affixed to the beams by adhesive, so that beam surfaces run smoothly on the glide strips and the strut assembly can be extended and retracted with ease.

19 Claims, 1 Drawing Sheet

(56) References Cited

U.S. PATENT DOCUMENTS

2008/0099654 A1* 5/2008 Bailly ................... B66C 23/707
                                                    248/644
2015/0290058 A1* 10/2015 Panzer ..................... B66F 3/28
                                                    403/109.6

* cited by examiner

EXTENDABLE STRUT

PRIORITY: CROSS-REFERENCE TO THE RELATED APPLICATION

This application is a continuation-in-part of U.S. Utility application Ser. No. 15/212,223 "No-Lift Install System," filed 16 Jul. 2016 which is currently pending and which claims the benefit of and priority to U.S. Provisional application Ser. No. 62/198,121 "Fabricator's Friend," filed 28 Jul. 2015. This continuation application also claims the benefit of and priority to said application Ser. No. 15/212,223 and 62/198,121.

The entire contents of application Ser. No. 15/212,223 "No-Lift Install System," and the entire contents of application Ser. No. 62/198,121 "Fabricator's Friend," are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This invention relates to load-bearing struts which are adjustable in length between a fixed end and an extendable end, and withstand compressive or tensile loads applied along a longitudinal axis, while often resisting bending moments, especially those applied at an extendable end, and also resisting torsional displacement of the extendable end with respect to the fixed end.

BACKGROUND

Extendable struts as mechanical or kinematic members of larger machines are generally devices which are variable and controllable along one longitudinal axis, said axis originating at a fixed end and including an extendable end. Among various constructions, extendable struts can be built up of beam members slidably coupled to extend in one direction or along one longitudinal axis. Extension members which operate along more than one longitudinal axis are outside the scope of the invention.

Extendable struts are called upon to raise and lower loads, and may also be used to support a cantilevered load. Acting horizontally or at an angle reclined from vertical, adjustment of the extension can support the cantilevered close to or distant from the fixed end. One useful and commonly known example is raising and lowering a car in a repair shop for safe and easy access to components on its underside.

Besides locating a load or object by a specific, static adjustment of an extendable strut, dynamic extension and retraction of a strut can be used transport objects or move them relative to other objects or points of reference.

Whether driven by mechanically generated forces or by human muscle power, for extendable struts it is also important that the interfaces comprising slidable couplings also exhibit low friction. Many strategies exist for reducing friction at the interface between moving components, most crucially involving the prudent selection of materials sufficiently dissimilar to prevent galling or fretting corrosion in use.

Other strategies for reducing friction include depositing liquid lubricants or greases at the sliding interfaces, but these products attract dirt and dust, and retain tiny chips and wear particles shed by the load-bearing materials running against each other. Extraneous applied lubricants must be removed and regularly replaced when these become excessively contaminated with retained wear particles, or when they succumb to environmental or even biological deterioration such as when natural oils go rancid. The need for regular replacement necessitates additional tasks such as scheduled inspections or maintenance, and clean-out and disposal of waste lubricants. Cloying environmental sensitivities and stultifying regulations have made the handling and disposal of waste lubricants a tedious concern; increasing disposal costs which in turn accrue to maintenance costs and more complicated logistics. It is therefore an additional objective of the invention to eliminate or at least greatly reduce the need for lubricants to be applied to sliding interfaces of the invention.

Often, preferred positioning of an object supported by an extendable strut requires that rotation of the extendable end in the longitudinal axis, which is the axis of extension of the device, is constrained with respect to the fixed end. In the car repair shop lift example, it is unwanted that the car should rotate about the lifting axis while it is being raised or lowered.

BRIEF SUMMARY

The invention pertains to struts having a minimum or retracted length and a maximum or extended length and which are continuously variable in length between a minimum and a maximum extent. Other devices which instead offer a discrete, finite set of length options, such as transverse pins or detents operating within a liner array of transverse holes in a beam, are outside the scope of the invention.

It is therefore appreciated that a primary objective of the invention is to inhere sufficient mechanical, material, and structural strength to safely withstand all service loads originating from the masses and inertias of the objects being moved, transported, positioned, or supported by the extendible strut.

Another important design objective of the invention and any movable strut is to reduce friction within mechanical couplings.

An additional objective of the invention is to prevent rotational displacement of the extendable end along the extension axis of the strut, with respect to the fixed end during extension, retraction, and anytime when the strut is adjusted to any intermediate length between its minimum and maximum length.

Various devices are currently available which attempt to address these challenges, although many meet only one or two aspects of the totality of the requirements.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

DETAILED DESCRIPTION OF CERTAIN EMBODIMENTS

Figure 1:
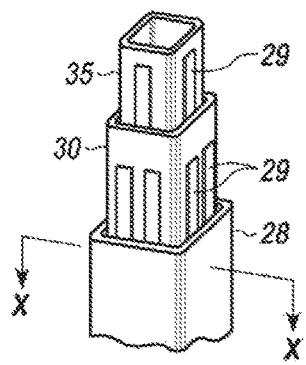
FIG. 1 shows a set of nested tubes in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this specification, the term "means for . . . " as used herein including the claims, is to be interpreted according to 35 USC 112 paragraph 6.

Also, for bulleted lists of items of an alphabetic series "a," "b," "c" . . . and so on, the letters "i" and "o" shall be omitted from the series to eliminate confusion with numerals "1" and "0."

As used herein, the term "strut" means and describes any substantially linear assembly of beams rods, or bars, especially but not limited moveable or static, whereby said assembly is designed to withstand compression loads and forces and bending moments, and especially to support or lift other objects of mass or weight.

Also as used herein, the term "strut extending mechanism" although in the preferred embodiment is an electric motor driven threaded rod, may refer to any of a plethora of mechanical, pneumatic, electrical, or hydraulic mechanisms used to extend the nested telescoping members of the vertically extendable strut, as would be well known in industry.

Also as used herein, the terms "nested" and "nestable" pertain to sets objects and especially sets of beams, tubes, or other longitudinal members in which all elements of a set or all but the smallest member of a set have complementary hollow cross sections which are substantially congruent and vary primarily in scale so that when elements of a set are ordered by size, any one element fits within the hollow cross section of the next larger element of the series. (Russian) Matryoshka dolls are an example of a set of nested objects.

The invention relates to a novel design for an extendable strut assembly comprised of a set of nested beam members or tubular members, each being of substantially constant cross-section over its length. Extension, retraction, and controlled positioning of beam or bar components of the strut assembly can be effected by any sort of drive mechanism, including but not limited to linear actuators which can be operated by electronic, hydraulic, pneumatic, or other means, and also mechanical extension means such as but not limited to a rotatable threaded rod or bar.

The drive mechanism itself is outside the scope of the invention, but it can be located within the set of beams or on the exterior of the assembly of beams. To reduce binding of the beams, it is advantageous to locate the drive mechanism as close to the centroid of the cross-sectional area of the set nested beams of the extendable strut assembly. When this is not possible, a second drive mechanism may be located directly opposite the centroid from the first so that the two acting in tandem will not create buckling forces or bending moments within the beam assembly. More than two actuators may also be employed but in such case, mechanical engineering prudence would require that the forces generated by the drives acting in concert should equate as nearly as possible to a single force acting at the centroid. The location of the centroid of the cross section of a set of nested beams is an inherent property of the set of beams, and the extendable strut also defines by its shape a longitudinal axis.

In another example of a drive mechanism, a first portion of a threaded rod is constrained from axial travel and affixed to a portion of an extendable strut, and a second portion is threadably coupled to another portion of said extendable strut, so that rotation of the treaded rod effects linear translation of said second portion with respect to said first portion, effectively changing the length of said strut. When a strut length increases, this motion is defined as extension of an extendable strut and conversely, retraction of a strut is defined as a decrease in the length of a strut. Also within this specification, an extendable strut may be referred to as an extendable member, and an extendable member may not necessarily be oriented vertically within the invention. The longitudinal axis defined by the strut components may also be referred to as an extension axis.

One preferred embodiment of the invention is shown in FIG. 1. The extendable strut assembly is comprised of a nested series of at least two rectangular beams. Three beams are shown in the figure, the smallest of which [35] may be either a hollow rectangular tube or a solid bar. The other two beams in this embodiment are hollow rectangular tubes [28, 30.] When a rectangular beam is nested within a rectangular tube, each one of the four external, substantially planar surfaces of the beam becomes registered with a complementary one substantially planar internal surface of the tube within which it is nested. With all beam members centered coaxially, each of the four external, substantially planar surfaces of the beam is also spaced apart from its complementary substantially planar internal surface of the tube within which it is nested.

In FIG. 1, a fixed base tube [28] surrounds a linearly movable inner rectangular tube [30.] The inner tube has strips [29] of adhesive-backed slick material [29] such as UHMV-PE of a best mode thickness selected so that the thickness of the adhesive plus that of the strip material is approximately one half of the clearance between tube walls in a given direction. With clearances between all spaced apart surfaces now taken up by glide strips of appropriate thicknesses, the nested contours of the beams enforce uniaxial translation of all members comprising the strut assembly, and prevent axial rotation the inner beam with respect to the outer beam.

Thus, sets of strips [29] deposited between opposite sides of a rectangular tube completely take up the clearance, and provide smooth, uniaxial extension with no slop or rattle. Applied to all four sides of an inner rectangular beam [30,] a novel means of precision extension along one axis is afforded. These strips may also be called glide strips because they improve the ease by which one nested member may slide with respect to another. Materials for the glide strips should be chosen so that the beams slide easily; i.e, the friction coefficient between the beam and the glide strip should be as low as possible. Among commercially available plastics, ultra-high molecular weight polyethylene (UHMW-PE) is a good choice for running upon steel, and it is available in strips of various widths and thicknesses and which include adhesive backing on one surface. Adhesive-backed strips are also available in many other materials, and as supplied they can be cut to length to make the glide strips of the invention, and then readily and permanently affixed to beam surfaces so that they run snugly and smoothly, and the beams can be extended and retracted with ease.

For an extendable strut assembly comprising an inner beam and an outer tube only, a preferred embodiment comprises: a hollow outer rectangular tube comprising four interior surfaces, an inner rectangular beam further comprising four exterior surfaces, and with the inner rectangular beam nested within the outer rectangular tube so that each of the four exterior surfaces of the inner rectangular beam is registered with and spaced apart from a complementary interior surface of the outer rectangular tube, and also having at least one glide strip disposed between each of the four exterior surfaces of the inner beam and each of the complementary interior surfaces of said outer tube. The glide strips may be affixed to either the inner beam or the outer tube or some affixed to the inner beam while others are affixed to the outer tube.

The linearly movable inner tube [28] with its inner rectangular tube [30] may itself contain a smaller rectangular tube [35] within its own inner walls. Although three nested tubes are shown in this figure, an extendable strut assembly having only two rectangular tubes is also within the scope of the invention, and there is no limit to the number of telescoping tubes which may be so concentrically and coaxially nested.

Figure 2:
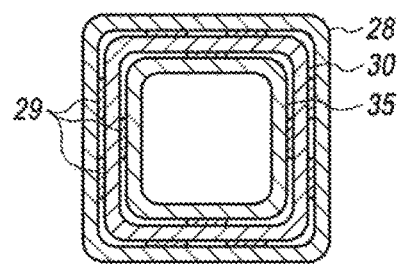
FIG. 2 shows a cross-section of a set of nested tubes in accordance with a preferred embodiment of the invention.

FIG. 2 is a cross section of a 3-tube embodiment of the extendable strut invention. The cross section is taken at section x-x seen in FIG. 1. In this embodiment shown, the innermost rectangular tube [35] has a single glide strip [29] on each of its four external faces, another rectangular tube [30] of intermediate size has two glide strips [29] on each of its four external faces, In an extension or retraction motion, the glide strips of the innermost tube ride snugly and smoothly between inside the intermediate tube, and the glide strips of the intermediate tube ride snugly and smoothly within the outermost rectangular tube [28.]

Each inner tube may have on its substantially planar external surfaces or substantially planar internal surfaces one, two, or any number of friction reducing strips [29,] of properly selected thicknesses such that the entire extensible assembly operates smoothly and with no axial misalignment of the rectangular tubes comprising the telescoping assembly.

Thus, an extendable strut assembly in accordance with the invention may comprise: a hollow outer rectangular tube comprising four interior surfaces, an inner rectangular beam further comprising four exterior surfaces, with at least one hollow intermediate rectangular tube further comprising four interior surfaces and four exterior surfaces, and with the inner rectangular beam nested within one of the hollow intermediate rectangular tubes, so that each of the four exterior surfaces of the inner rectangular beam is registered with and spaced apart from a complementary interior surface of one the hollow intermediate rectangular tubes, with one hollow intermediate rectangular tubes nested within the hollow outer rectangular tube, so that each of the four exterior surfaces of one hollow intermediate rectangular tubes is registered with and spaced apart from a complementary interior surface of said hollow outer rectangular tube. At least one glide strip is disposed between each of the four exterior surfaces of the inner beam and the complementary interior surfaces of a hollow intermediate rectangular tube, and at least one glide strip is disposed between each of the four interior surfaces of the hollow outer rectangular tube and each of the complementary interior surfaces of a hollow intermediate rectangular tube.

Figure 3:
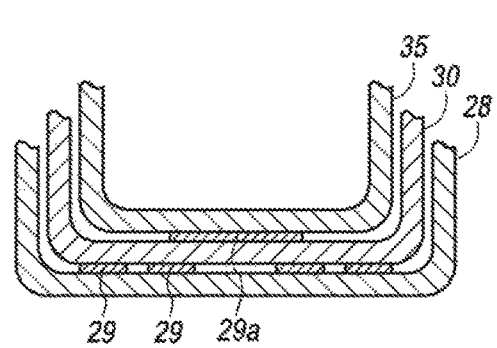
FIG. 3 shows a cross-section of a set of nested tubes in accordance with an alternative embodiment of the invention.

FIG. 3 is a cross section of a partial view showing additional aspects of optional embodiments within the scope of the invention. Although in FIG. 1 and FIG. 4, the glide strips all appear to be of substantially equal width, glide strips may have different widths at different portions of the invention, and furthermore they may be tapered in width along the longitudinal axis of the assembly. Where more than one glide strip is affixed to the same surface of a rectangular tube member, they may be evenly spaced or deployed in heterogeneous groups or spacings. In this illustration, four strips [29] deposited between rectangular tube members [30] and [28] are arranged into two sets of pairs.

It is also equally feasible to interpret FIG. 3. as an embodiment in which any number of the four strips [29] are affixed to the outer tube [28] with the balance of the four being affixed to the intermediate tube [30.]

Figure 4:
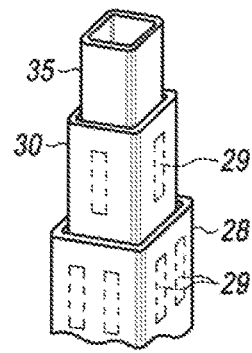
FIG. 4 shows a set of nested tubes in accordance with an alternative embodiment of the invention.

FIG. 4 shows a yet further alternative embodiment in accordance with the invention. In this case the glide strips [29] are affixed to the inside surfaces of the rectangular tubes [28] and [30] while the innermost tube [35] has no glide strips affixed to it. This configuration may be preferred to that of FIG. 1 where the working environment of the extendable strut assembly would be detrimental to exposed glide strips. Such adverse environments might include dusty or dirty conditions, or areas of operation where flying foreign objects such as chips flung from a cutting or milling machine could ingratiate themselves between the glide strips and the tube walls upon which they slide. Many other environmental factors exist for which it is preferable that the glide strips, being of a much softer or malleable material than the beams, are preferred to be disposed on the inside surfaces of the telescoping tubes and thus less exposed to exterior environmental elements.

Also to be noted in FIG. 4 is that the glide strips shown only extend for a short portion of the overall length of the beams. Glide strips of any fraction of length of the beam to which they are affixed are all in accordance with the invention. Moreover, it should be noted that the cross section illustrated in FIG. 2 may represent either the embodiment shown in FIG. 1 or that shown in FIG. 3, or even an additional embodiment described here: An intermediate size tube may have glide strips affixed to its inner or its outer surfaces, or to both inner and outer surfaces, wherein for the case of a 3-tube assembly, no other strips would need to be affixed to any other beam member. This configuration is a manufacturing improvement in that the tasks of aligning and affixing glide strips to a beam member would be concentrated upon only one of the three beams, minimizing fixturing and simplifying other documents such as work instructions explaining how and where to affix the glide strips, and also simplifying inspection and quality control processes and documentation.

Figure 5:
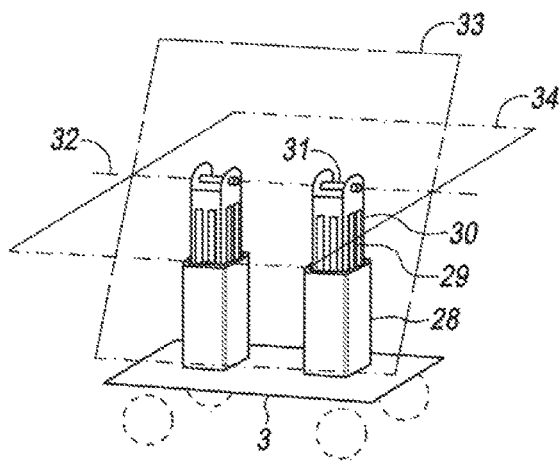
FIG. 5 shows a specific application incorporating the invention: a rolling cart with a tiltable frame having a pivot axis which is adjustable in height by means of extendable struts in accordance with the invention.

Lastly, FIG. 5 shows a specific application of a larger mechanical assembly which incorporates the invention: a rolling cart [3] with a tiltable frame having a pivot axis [32] which is adjustable in height by means of two extendable strut assemblies in accordance with the invention. Each extendable strut assembly has a vertically movable inner rectangular tube [30] holding a pivot axle [31] and all pivot axles are coaxially aligned, thereby defining a single pivot axis [32] for the tiltable frame. Each strut assembly also has an outer rectangular tube [28] and glide strips disposed between the exterior surfaces of the inner tube and the interior surfaces of the outer tube. The rolling cart therefore has a vertically adjustable pivot axis for the tiltable frame as defined by the vertically extendible struts. The tiltable frame is vertically adjustable as is the height from the cart to its pivot axis. The tiltable frame can pivot from a horizontal orientation [34] to a near vertical orientation [33.] The nested rectangular tubes constrain the aligned pivot axles [31] so that they do not rotate out of coaxial alignment during any extension or retraction of the extendable strut assemblies.

Figure 6:
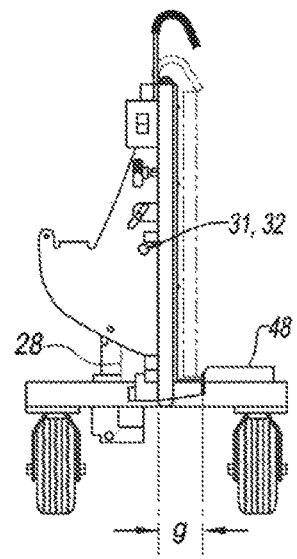
FIG. 6 shows a rolling cart which is a slab moving device, with its tiltable frame in a vertical position.

FIG. 6 shows a rolling cart which is for moving slabs, with its tiltable frame in a vertical position. The slab being carried is shown in phantom line in this figure. The base of the cart includes at least one transit chock [48] spaced apart from a vertically extendable strut [28] leaving a gap [g] between the vertical struts and the one or more transit chocks. The height of the tiltable frame may be lowered so that the lowered edge of the tiltable frame and the slab it is carrying will drop into this gap. This condition enhances in-transit safety because in the event that the pivot plates become accidentally unlocked, uncontrolled rotation of the tiltable frame will be confined to a narrow angle between the vertical strut and the transit chock. This is a redundant safety feature found in no other wheeled cart directed to the transport of sheet materials and countertops. The frame is a generally planar frame and the pivot axis [32] and the coaxially aligned pivot axles [31] are seen in end view in this figure.

Since any square also a rectangle, square tubing and square bars are contemplated within as being within the scope of the invention wherever rectangles are mentioned or written. Square bars and rectangular bars have solid cross sections and four external, substantially planar surfaces, not including fillets or chamfers at their long edges. Similarly, square tubes and rectangular tubes have hollow cross sections and wall thicknesses, and also have four external substantially planar faces and four internal substantially planar faces, again not including fillets or chamfer surfaces at the interior or exterior corners of their cross-sections. In this specification, solid bars and hollow tubes are both referred to as beams or beam members.

While certain features and aspects have been described with respect to exemplary embodiments, one skilled in the art will recognize that numerous modifications are possible. Also, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently and in summary, although many exemplary embodiments are described above, it will be appreciated that the invention is intended to cover all modifications and equivalents within the scope of the following claims.

What is claimed is:

1. A rolling cart for moving slabs, comprising:
    a generally planar frame having a vertically adjustable pivot axis,
    and at least one vertically extendable strut assembly affixed to said rolling cart and further comprising:
        a pivot axle,
        a hollow outer rectangular tube comprising four interior surfaces,
        an inner rectangular beam comprising four exterior surfaces,
        with said inner rectangular beam nested within said outer rectangular tube so that each of said four exterior surfaces of said inner rectangular beam is registered with and spaced apart from a complementary interior surface of said outer rectangular tube, and
        at least one glide strip disposed between one of said four exterior surfaces of said inner beam and the complementary interior surface of said outer tube to which it is registered, and
    at least one transit chock spaced apart from at least one of said vertically extendable strut to form a gap into which can be received said tiltable frame and a slab carried thereon,
    with said frame rotatably coupled to said vertically extendable strut assembly so as to be tiltable between a horizontal and a vertical position.

2. The rolling cart of claim 1, wherein said inner rectangular beam is a hollow rectangular tube.

3. The rolling cart of claim 1, wherein said at least one glide strip is affixed to an exterior surface of said inner rectangular beam.

4. The rolling cart of claim 1, wherein at said at least one glide strip is affixed to an interior surface of said outer rectangular tube.

5. The rolling cart of claim 1, wherein said inner rectangular beam is square.

6. The rolling cart of claim 1, wherein said outer rectangular tube is square.

7. The rolling cart of claim 1, wherein said at least one glide strip comprises ultra-high molecular weight polyethylene.

8. The rolling cart of claim 1, wherein said at least one glide strip is an adhesive-backed strip.

9. A rolling cart for moving slabs, comprising:
   a generally planar frame having a vertically adjustable pivot axis,
   and at least one vertically extendable strut assembly affixed to said rolling cart and further comprising:
   a pivot axle,
   a hollow outer rectangular tube comprising four interior surfaces,
   an inner rectangular beam comprising four exterior surfaces,
   at least one hollow intermediate rectangular tube comprising four interior surfaces and four exterior surfaces,
   with said inner rectangular beam nested within one of said at least one hollow intermediate rectangular tubes, so that each of said four exterior surfaces of said inner rectangular beam is registered with and spaced apart from a complementary interior surface of said one of at least one hollow intermediate rectangular tube, and
   with one of said at least one hollow intermediate rectangular tubes nested within said hollow outer rectangular tube, so that each of said four exterior surfaces of said one of at least one hollow intermediate rectangular tubes is registered with and spaced apart from a complementary interior surface of said hollow outer rectangular tube, and
   at least one glide strip disposed between each of said four exterior surfaces of said inner beam and each of said complementary interior surfaces of said at least one hollow intermediate rectangular tube, and
   at least one glide strip disposed between each of said four interior surfaces of said hollow outer rectangular tube and each of said complementary interior surfaces of a hollow intermediate rectangular tube, and
   at least one transit chock spaced apart from at least one of said vertically extendable strut to form a gap into which can be received said tiltable frame and a slab carried thereon,
   with said frame rotatably coupled to said vertically extendable strut assembly so as to be tiltable between a horizontal and a vertical position.

10. The rolling cart of claim 9, wherein said inner rectangular beam is a hollow rectangular tube.

11. The rolling cart of claim 9, wherein said at least one glide strip is affixed to an exterior surface of said inner rectangular beam.

12. The rolling cart of claim 9, wherein said at least one glide strip is affixed to an interior surface of said hollow outer rectangular tube.

13. The rolling cart of claim 9, wherein at least one glide strip is affixed to an interior surface of said at least one hollow intermediate rectangular tube.

14. The rolling cart of claim 9, wherein at least one glide strip is affixed to an exterior surface of at said least one hollow intermediate rectangular tube.

15. The rolling cart of claim 9, wherein said inner rectangular beam is square.

16. The rolling cart of claim 9, wherein said outer rectangular tube is square.

17. The rolling cart of claim 9, wherein at said least one hollow intermediate rectangular tube is square.

18. The rolling cart of claim 9, wherein said at least one glide strip comprises ultra-high molecular weight polyethylene.

19. The rolling cart of claim 9, wherein said at least one glide strip is an adhesive-backed strip.

* * * * *